United States Patent [19]

Chakmakjian et al.

[11] Patent Number: 5,500,865
[45] Date of Patent: Mar. 19, 1996

[54] PHASED CASCADING OF MULTIPLE NONLINEAR OPTICAL ELEMENTS FOR FREQUENCY CONVERSION

[75] Inventors: Stephen H. Chakmakjian, Sandia Park; Mark T. Gruneisen, Tijeras; Karl W. Koch, III; Gerald T. Moore, both of Albuquerque, all of N.M.

[73] Assignee: The United States of America as represented by the Secretary of the Air Force, Washington, D.C.

[21] Appl. No.: 308,109

[22] Filed: Sep. 13, 1994

[51] Int. Cl.⁶ .................................................. H01S 3/109
[52] U.S. Cl. ............................ 372/22; 359/328; 359/326
[58] Field of Search ................... 385/122; 359/326–332; 372/21–22

[56] References Cited

U.S. PATENT DOCUMENTS

| | | | |
|---|---|---|---|
| 3,644,845 | 2/1972 | Harris | 359/330 X |
| 3,810,041 | 5/1974 | Martin | 331/94.5 |
| 4,660,204 | 4/1987 | Dewhirst et al. | 372/16 |
| 4,809,282 | 2/1989 | Dewhirst | 372/16 |
| 4,998,259 | 3/1991 | Chandra et al. | 372/68 |
| 5,077,748 | 12/1991 | Kozlovsky et al. | 372/22 |
| 5,099,486 | 3/1992 | Acharekar et al. | 372/32 |
| 5,117,126 | 5/1992 | Geiger | 359/330 |
| 5,119,383 | 6/1992 | Duling, III et al. | 372/21 X |
| 5,206,868 | 4/1993 | Deacon | 372/21 |

*Primary Examiner*—John D. Lee
*Attorney, Agent, or Firm*—Robert L. Nathans; Stanton E. Collier

[57] ABSTRACT

Optical frequency doubling apparatus is disclosed having a system output portion and a source of coherent radiation together with a plurality of discreet nonlinear light transmissive devices positioned in series between the source of coherent radiation and the system output portion, and further including a phase shifter positioned in series with the nonlinear light transmissive devices for altering the phase of light wavefronts passing therethrough. A harmonic beamsplitter is used to separate the frequency doubled output from the coherent light inputted into the system by the source of coherent radiation.

21 Claims, 2 Drawing Sheets

PHASED CASCADING OF MULTIPLE NONLINEAR OPTICAL ELEMENTS FOR FREQUENCY CONVERSION

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of the processing of laser light and more particularly to frequency doubling of such light.

Existing laser sources do not provide adequate coverage of the optical spectrum. Consequently, it is typically useful to double the frequency of a laser, to sum the frequency of two different lasers, to produce new frequency sources, or to parametrically generate new frequency sources. The efficiency of these processes is typically less than 50% in most commercial systems available today. Thus, it is desirable to provide a technique which will improve the frequency conversion efficiency of second harmonic generators (SHG), sum frequency generators (SFG), optical parametric oscillators (OPO), and optical parametric amplifiers (OPA). In accordance with the present invention, this technique comes about by increasing the nonlinear interaction length of an SHG, SFG, or OPO process. This technique can be applied to systems which are critically, noncritically, or quasi-phase-matched and could also be used for a nonlinear frequency conversion process such as frequency up conversion where one of the sources is a laser and the other source is incoherent.

Increasing either the intensity of the laser source or increasing the nonlinear medium length can be used to achieve increased nonlinear conversion efficiency. Current methods for achieving these conditions include increasing the intensity. The intensity can be increased by using a more powerful pump laser source or by focusing the beam more tightly into the nonlinear medium. There are however, practical limits to how much power a given type of laser source can achieve. Focusing tightly has limited usefulness since diffraction effects cause the length of the focal region to decrease at the same rate that the intensity increases. Also, for some systems, the damage threshold intensity for the nonlinear medium is less than the intensity required for high efficiency nonlinear interactions.

Another technique for increasing conversion efficiency is to increase the interaction length. In most high power frequency conversion applications the nonlinear medium is a birefringent crystal that is cut at the proper angle such that the pump and generated frequency wavefronts maintain the phase-matching condition as they copropagate through the crystal. However, the length of these crystals is limited by the state of the art of crystal manufacturing processes. In most cases this is less than a few centimeters. Furthermore, for critical phase matching in birefringent crystals, different frequency beams propagate through the crystal at different directions, a phenomenon referred to as walk-off. Walk-off limits the effective interaction length to roughly the beam diameter divided by the walk-off angle.

Thus, in view of the foregoing, the nonlinearity cannot be arbitrarily increased due to: limited nonlinear medium length; limited laser power; and walk-off effects. It is for this reason that we have invented a technique to increase the interaction length of nonlinear interactions such as SHG and SFG by coupling two or more crystals together in the same system. Previously, the efficiency achieved using single-pass nonlinear frequency conversion has been limited by crystal length, intensity, and walk-off issues. For lasers whose peak output power is adequate to achieve high intensities without focusing (such as Q-switched lasers), high efficiencies of 60% or more can be achieved. However when focusing is required, such as in the cases of cw or cw-mode-locked lasers, the doubling and sum-frequency conversion efficiencies are typically no more than 25%. In the case of cw lasers, the limiting factors are short focal depth or inadequate laser intensity.

Alternate methods of enhancing SHG efficiency include constructing an optical cavity around the nonlinear medium. The cavity circulates the non-converted pump power so that the pump power inside the cavity builds up to a higher value than the incident pump power and the pump photons pass more than once through the nonlinear medium. The intracavity power will increase until the total cavity loss limit is reached. If the linear cavity loss can be much less than the single pass conversion, then high efficiency doubling can be achieved in this manner. However, this method involves complicated engineering to match the external cavity to the laser cavity. Optical cavity lengths must be matched to within a fraction of the wavelength of the pump radiation. Typically, a closed-loop servo system is required to achieve this cavity length-matching condition. Such systems are often complicated and susceptible to mechanical instabilities. To avoid constructing a second cavity, the nonlinear medium may be placed inside the pump laser cavity. The output coupling mirror of the cavity is replaced with a dichroic mirror which will out-couple all of the second harmonic and totally reflect the fundamental pump radiation. In theory, the nonlinear medium length and focusing parameters can be adjusted to convert all the pump radiation which would have exited the original cavity into the second harmonic. However, loss effects can prevent this from happening, and temporal instabilities typically result from intracavity doubling. Furthermore, the efficiency for intracavity doubling can only be optimized for a particular output power level since the SHG process with the dichroic mirror is analogous to the output coupling in a simple laser cavity. In most practical cases, a pump laser source of two to four times the intensity of the desired frequency source must be developed in order to achieve adequate power at the desired frequency. Development of an oversized pump laser typically represents increased expense, power consumption, and cooling requirements.

BRIEF SUMMARY OF THE INVENTION

In accordance with the present invention, the frequency-doubled output power of a laser system is increased by a factor of two without increasing the size of the pump laser. Multiple nonlinear frequency doubling crystals are employed in a tandem arrangement with inter-crystal phase adjustment plates to maintain proper phasing of the fields. The result leads to savings of cost, laser power and weight in operational systems.

BRIEF DESCRIPTION OF THE DRAWINGS

Other features and advantages of the present invention will become apparent upon study of the following description, taken in conjunction with the drawings in which.

DETAILED DESCRIPTION OF A PREFERRED EMBODIMENT OF THE INVENTION

Figure 1:
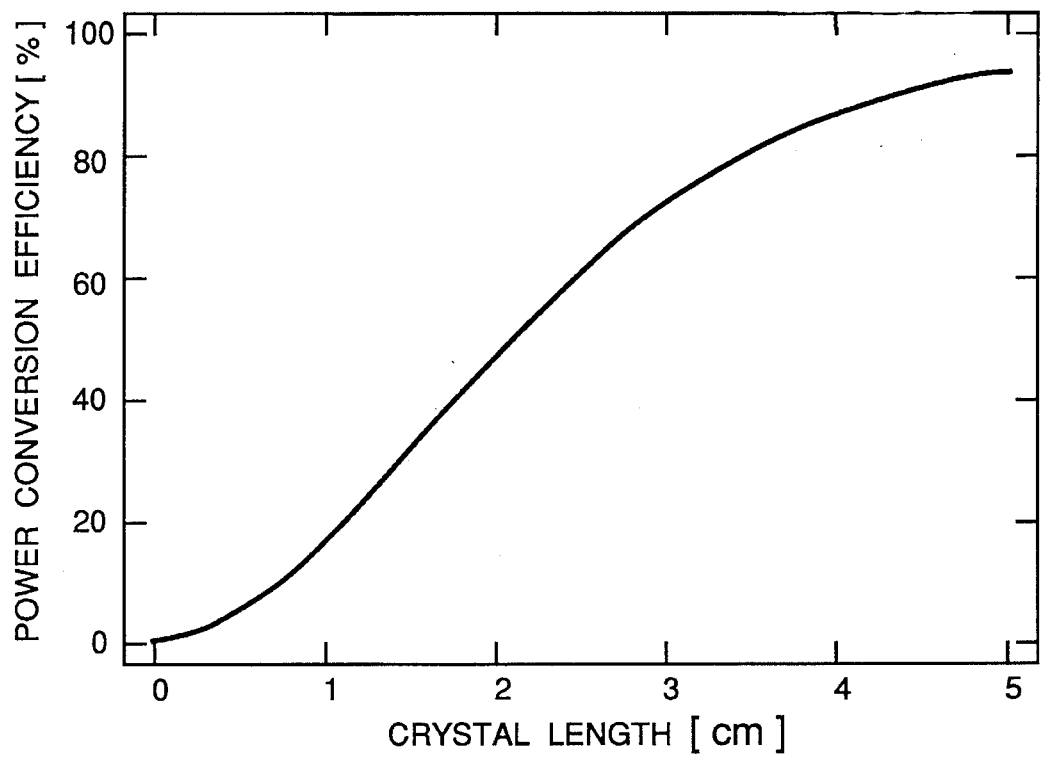
FIG. 1 is a graph relating the theoretical calculation of second-harmonic conversion efficiency versus crystal length.
Figure 2:
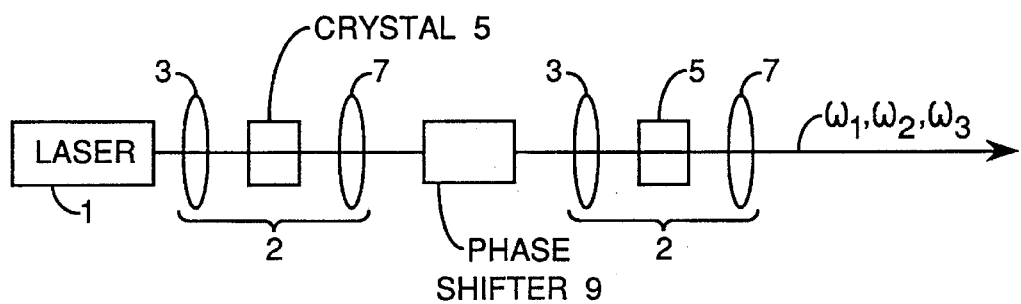
FIG. 2 schematically illustrates a multi-element nonlinear frequency conversion system.

The doubling efficiency for SHG using lithium triborate (LBO) is plotted in FIG. 1 to illustrate the advantage of increased nonlinear interaction length. The first part of the curve shows a quadratic dependence of the SHG efficiency on the interaction length of the lithium triborate (LBO) crystal. The advantage of adding a second crystal is especially appreciable if the efficiency with a single crystal is 25% or less. The efficiency of SFG and OPA/OPO processes display a similar nonlinear dependence on interaction length. The system we have developed allows two or more nonlinear crystals of length L to act like a single crystal of length 2L or nL where n is the number of nonlinear crystals coupled. The interacting laser beams are recollimated and refocused between crystals in order to maintain high intensities over the entire interaction length. A schematic of the system is shown in FIG. 2. The input radiation fields from laser i enter the first element or stage 2, which in general, consists of a focusing lens 3, a nonlinear medium 5 such as an LBO crystal, and a recollimating lens 7. The pump and generated waves now have a well defined phase difference between them. However, after passing through the recollimating optic, optical coatings, and focusing optics in the system, the phase difference will not be of the proper value for continued frequency conversion. Consequently, it is necessary to adjust the relative phase of the waves to a value at which continued frequency conversion will occur. Once the proper phase difference is achieved, the conversion process will proceed as if the two or more nonlinear elements within the stages 2 were one contiguous element.

The optimum focusing arrangement is selected by optimizing each element individually. If each element or stage 2 consists of identical nonlinear elements, then the same focusing is used for each element. The phase shifter 9 must provide a relative phase shift between the various waves involved in the nonlinear conversion process. This can be most easily be accomplished using the dispersive properties of two counter rotating glass plates. Counter rotating plates are used so that no net displacement of the beams occurs as the plates are rotated. Other ways to accomplish this dispersive phase shift include but are not limited to: a gas pressure cell; a varying path through air; and avariable path through a liquid. Instead of a strictly dispersive device, a birefringent phase shifter may be used to accomplish the relative phase adjustment. Since the first and second harmonic signals are often orthogonally polarized, an electro-optic phase shifter may be used to achieve the necessary relative phase shift.

Figure 3:
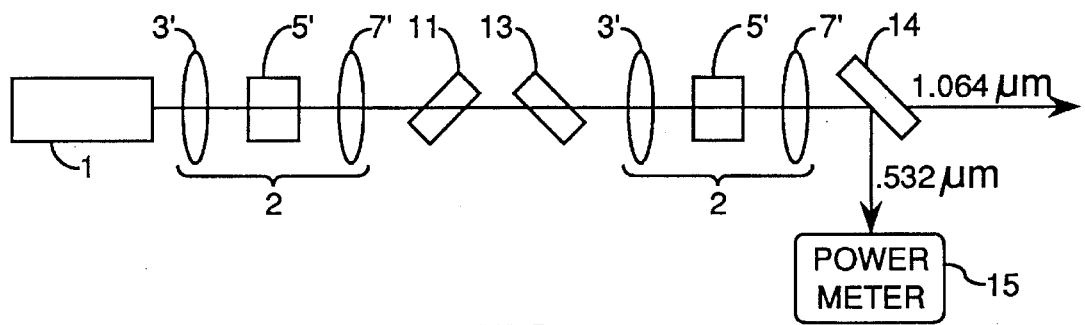
FIG. 3 illustrates a preferred embodiment of the present invention built by the inventors.
Figure 4:
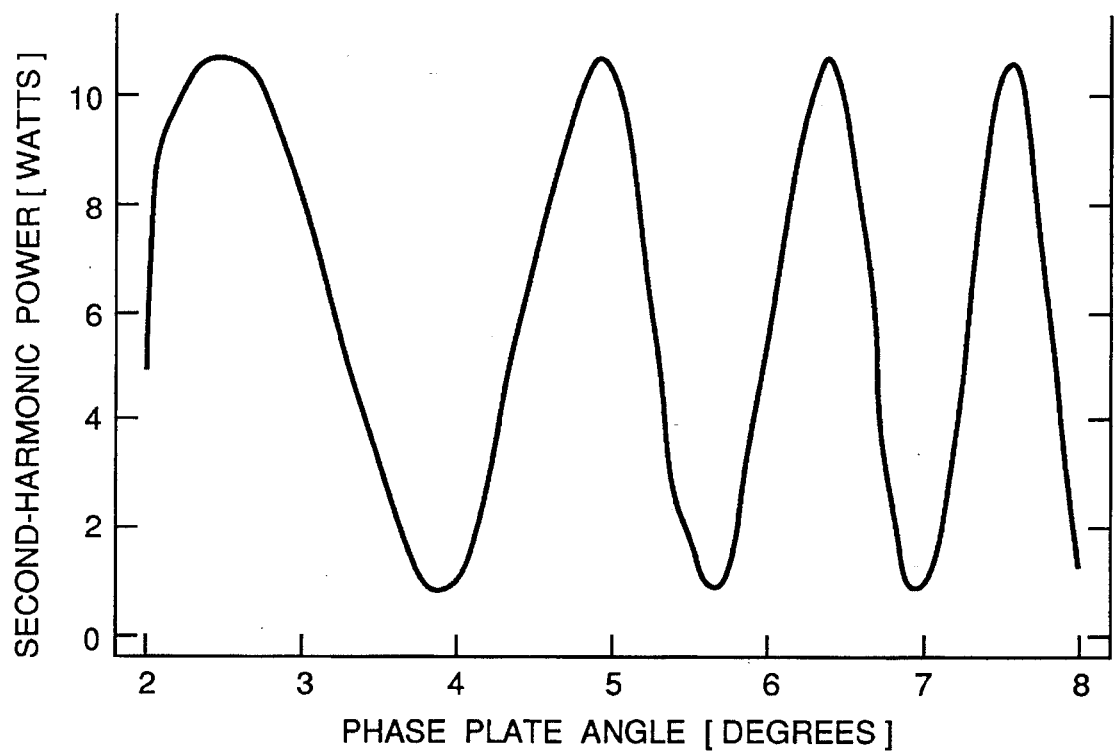
FIG. 4 illustrates the relationship between second-harmonic power versus phase plate angle.

FIG. 3 illustrates an experimentally tested embodiment of the invention in the case of SHG of a Nd:YAG laser 1 operating at a wavelength of 1.064 mm. The input pump is the 1.064 micron output of the laser 1 and the SHG signal is the resulting frequency doubled green light at a wavelength of 0.532 microns. The nonlinear crystal is lithium triborate (LBO) used for 90 degree noncritical type I phase matching. We used 1.5 cm long LBO crystals 5'. In each element or stage 2 of the tandem arrangement, two achromatic lenses 3' and 7' focus and recollimate respectively, both the 1.064 micron beam and the 0.532 micron beam passing through the LBO crystals. Lenses with focal lengths of 50 mm are used for this purpose. Each doubling element or stage 2 is independently optimized with the 20 Watt average output power from the laser. The laser operates cw-mode-locked mode in the TEM00 transverse mode. The pulses are about 100 picoseconds long and occur at a 70 MHz repetition rate. Once focused, the laser has a peak intensity of about 20 MW/cm2. In this configuration each of the doubling crystals acting alone would produce about 5 Watts of SHG signal. The theoretical SHG efficiency for LBO is plotted in FIG. 1 for this value of the pump intensity. The two doubling crystals 5' are put in series as shown in FIG. 3. Two counter-rotating glass plates 11 and 13 are placed between the crystals to produce the necessary phase =shift for the system to be optimized. The plates are operated near normal incidence and are AR coated at the pump and SHG signal wavelengths to minimize reflective losses. The optimum phase matching temperatures are set for each crystal individually. Once the two crystals are independently optimized for doubling, the total SHG signal is recorded as a function of the plate rotation angle. A harmonic beamsplitter 14 functions as a means for separating frequency converted light (0.532 microns) from the light generated by laser 1 (1.064 microns). FIG. 4 shows the SHG output power from the two crystal system as a function of the phase plate rotation angle. The intensity of the SHG signal, measured by power meter 15, optically coupled to beamsplitter 14, undergoes periodic oscillation as a function of the phase plate angle. The intensity of the two crystal output can be optimized or spoiled depending on the phase difference between the pump and SHG signals between the two crystals. The intensity of the SHG at the minimum configuration is actually less than the single crystal output of 5 watts as shown in FIG. 4. This minimum in SHG output occurs since the SHG signal generated in the first crystal actually converts back into the pump frequency in the second crystal for certain values of the phase difference between pump and SHG signal. With this system we have achieved a maximum conversion to SHG of 11.7 watts average power with a 20 watt pump power. In an operational system, the phase adjuster (in this case the angle of the plates) would be servoed to maximize the SHG, SFG, OPA, or OPO signal. For a properly designed system the adjustment of the phase is not a super-sensitive adjustment. If the entire system were thermally stabilized, the adjustment could be done once and left alone.

It should now be appreciated that our technique of using two or more nonlinear crystals in series offers several advantages over existing methods namely:

1. Increased efficiency. We have demonstrated an increase in SHG efficiency of over a factor of two using two LBO crystals. The efficiency of a single LBO crystal was 25% and we achieved 55% conversion by inserting the second crystal into the system. A third crystal should increase the conversion efficiency even more.

2. Maintained Focusing. It is not possible to maintain a tight locus necessary for high efficiency doubling over a long interaction length. With two or more crystals, the beams may be recollimated and refocused into the subsequent crystals.

3. Decreased risk of optical damage. To maximize efficiency with a finite length interaction medium, it is common to focus tightly enough to where the intensities within the nonlinear medium are close to the damage threshold for the material. In accordance with the present invention, high efficiency is achieved by increasing the interaction length instead of increasing the intensity.

4. Decreased Expense. Two crystals of length L are cheaper than one crystal of length 2L. It may not even be possible to obtain some crystals at lengths necessary for high efficiency single-pass frequency conversion.

5. Reduced walkoff. Two crystals with opposite direction of walkoff maintain beam overlap better than a single long crystal.

Although the invention has been described with reference to a particular embodiment thereof, numerous adaptions and modifications of the invention will be apparent to those of skill in the art and hence it is intended by the appended claims to cover all such modifications and adaptions as fall with the true spirit and scope of this invention.

What is claimed is:

1. Optical frequency conversion apparatus having a system output portion comprising:
   (a) a source of coherent radiation;
   (b) a non-absorbing phase shifting means having an input portion and an output portion for altering the phase of light wavefronts passing therethrough;
   (c) a first nonlinear light transmissive device positioned between the source of coherent radiation and the input portion of the phase shifting means;
   (d) a second nonlinear light transmissive device positioned between the output portion of said phase shifting means and the system output portion to supply frequency converted light energy thereto.

2. The apparatus of claim 1 including
   (e) first focussing means for focussing light generated by said source of coherent radiation upon the first nonlinear device;
   (f) first collimating means for collimating light emerging from said first nonlinear light transmissive device and directing such collimated light at the input portion of said phase shifting means; and
   (g) second focussing means for focussing light emerging from the output portion of said phase shifting means upon the second nonlinear light transmissive device.

3. Apparatus of claim 2 including light beam separation means for separating frequency converted light from light generated by said source of coherent radiation.

4. Apparatus of claim 3 wherein the first and second nonlinear light transmissive devices comprise nonlinear crystals.

5. The apparatus of claim 4 wherein said nonlinear crystals comprise lithium triborate.

6. The apparatus of claim 5 including second collimating means for collimating light emerging from said second nonlinear device.

7. Apparatus of claim 2 wherein the first and second nonlinear light transmissive devices comprise nonlinear crystals.

8. The apparatus of claim 7 wherein said nonlinear crystals comprise lithium triborate.

9. The apparatus of claim 2 including second collimating means for collimating light emerging from said second nonlinear device.

10. Apparatus of claim 1 including light beam separation means for separating frequency converted light from light generated by said source of coherent radiation.

11. Apparatus of claim 10 wherein the first and second nonlinear light transmissive devices comprise nonlinear crystals.

12. The apparatus of claim 11 wherein said nonlinear crystals comprise lithium triborate.

13. Apparatus of claim 1 wherein the first and second nonlinear light transmissive devices comprise nonlinear crystals.

14. The apparatus of claim 13 wherein said nonlinear crystals comprise lithium triborate.

15. The apparatus of claim 13 including second collimating means for collimating light emerging from said second nonlinear device.

16. Optical frequency conversion apparatus having a system output portion comprising:
    (a) a source of coherent radiation;
    (b) a plurality of discreet nonlinear light transmissive devices positioned in series between the source of coherent radiation and the system output portion; and
    (c) a non-absorbing phase shifting means positioned between said plurality of discreet nonlinear light transmissive devices for altering the phase of light wavefronts passing therethrough.

17. Apparatus of claim 16 including light beam separation means for separating frequency converted light from light generated by said source of coherent radiation.

18. Apparatus of claim 17 wherein said discreet nonlinear light transmissive devices comprise nonlinear crystals.

19. Apparatus of claim 18 wherein said nonlinear crystals comprise lithium triborate.

20. Apparatus of claim 16 wherein said discreet nonlinear light transmissive devices comprise nonlinear crystals.

21. Apparatus of claim 20 wherein said nonlinear crystals comprise lithium triborate.

* * * * *